(12) United States Patent
Klokk

(10) Patent No.: US 8,851,573 B2
(45) Date of Patent: Oct. 7, 2014

(54) NECK REST

(75) Inventor: Jan Kato Klokk, Sykkylven (NO)

(73) Assignee: Ekornes ASA (NO)

( * ) Notice: Subject to any disclaimer, the term of this patent is extended or adjusted under 35 U.S.C. 154(b) by 49 days.

(21) Appl. No.: 13/881,013

(22) PCT Filed: Nov. 2, 2011

(86) PCT No.: PCT/NO2011/000309
§ 371 (c)(1),
(2), (4) Date: May 28, 2013

(87) PCT Pub. No.: WO2012/060716
PCT Pub. Date: May 10, 2012

(65) Prior Publication Data
US 2013/0328373 A1    Dec. 12, 2013

(30) Foreign Application Priority Data

Nov. 2, 2010  (NO) .................................. 20101537

(51) Int. Cl.
*A47C 7/36* (2006.01)
*A47C 7/38* (2006.01)
*B60N 2/48* (2006.01)

(52) U.S. Cl.
CPC ........... *A47C 7/38* (2013.01); *B60N 2002/4894* (2013.01); *B60N 2/4844* (2013.01); *B60N 2/485* (2013.01)
USPC ....................................... 297/391; 297/463.1

(58) Field of Classification Search
USPC ....................... 297/391, 408, 463.1
See application file for complete search history.

(56) References Cited

U.S. PATENT DOCUMENTS

| | | | | |
|---|---|---|---|---|
| 3,825,301 A * | 7/1974 | Schwarz | ........................ | 297/408 |
| 4,190,290 A * | 2/1980 | Strien | ............................ | 297/408 |
| 4,840,428 A * | 6/1989 | Kobayashi et al. | ........... | 297/408 |
| 4,844,544 A | 7/1989 | Ochiai | | |
| 5,316,372 A * | 5/1994 | Amner | ........................... | 297/408 |
| 6,722,740 B2 * | 4/2004 | Imayou et al. | ................. | 297/408 |
| 7,681,954 B2 * | 3/2010 | Barrou | ........................... | 297/408 |

FOREIGN PATENT DOCUMENTS

| | | |
|---|---|---|
| DE | 2037033 A1 | 3/1972 |
| DE | 2945060 A1 | 11/1979 |
| DE | 3318866 A1 | 11/1984 |
| JP | 2007-312802 A1 | 12/2007 |
| WO | 2012/060716 A1 | 5/2012 |

OTHER PUBLICATIONS

Norwegian Search Report, dated Jun. 1, 2011, 2 pages.
PCT International Preliminary Report on Patentability, dated Jan. 28, 2013; 8 pages.
PCT Notification of Transmittal of the International Preliminary Report on Patentability; dated Jan. 28, 2013; 1 page.

* cited by examiner

*Primary Examiner* — Philip Gabler
(74) *Attorney, Agent, or Firm* — Seyfarth Shaw LLP

(57) ABSTRACT

It is described a neck rest where the cushion 1 is rotatably and eccentrically mounted on a mounting stay 2. The mounting stay is attached in a cushion by means of sector shaped hinges 3. The friction between the stay and cushion can be regulated by means of a wheel.

7 Claims, 13 Drawing Sheets

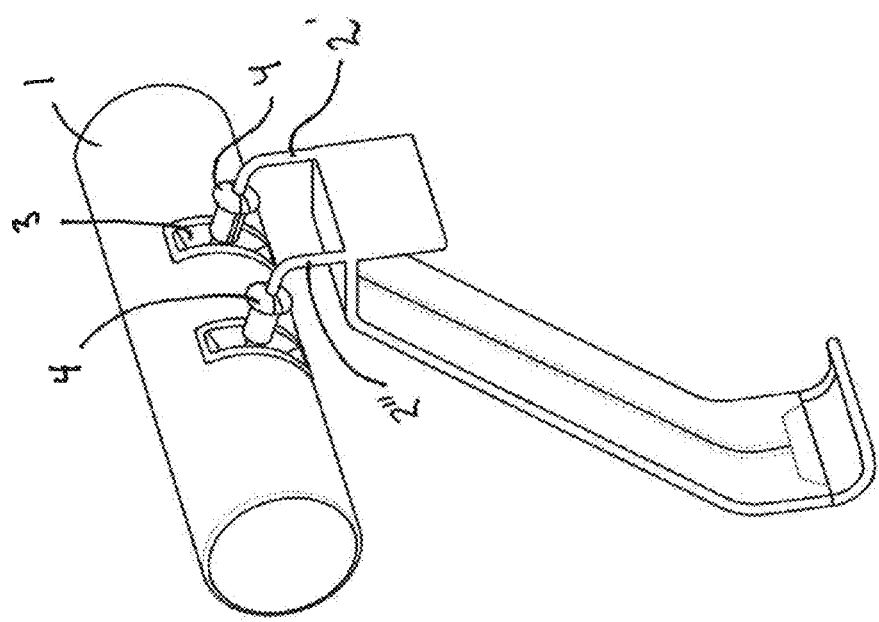

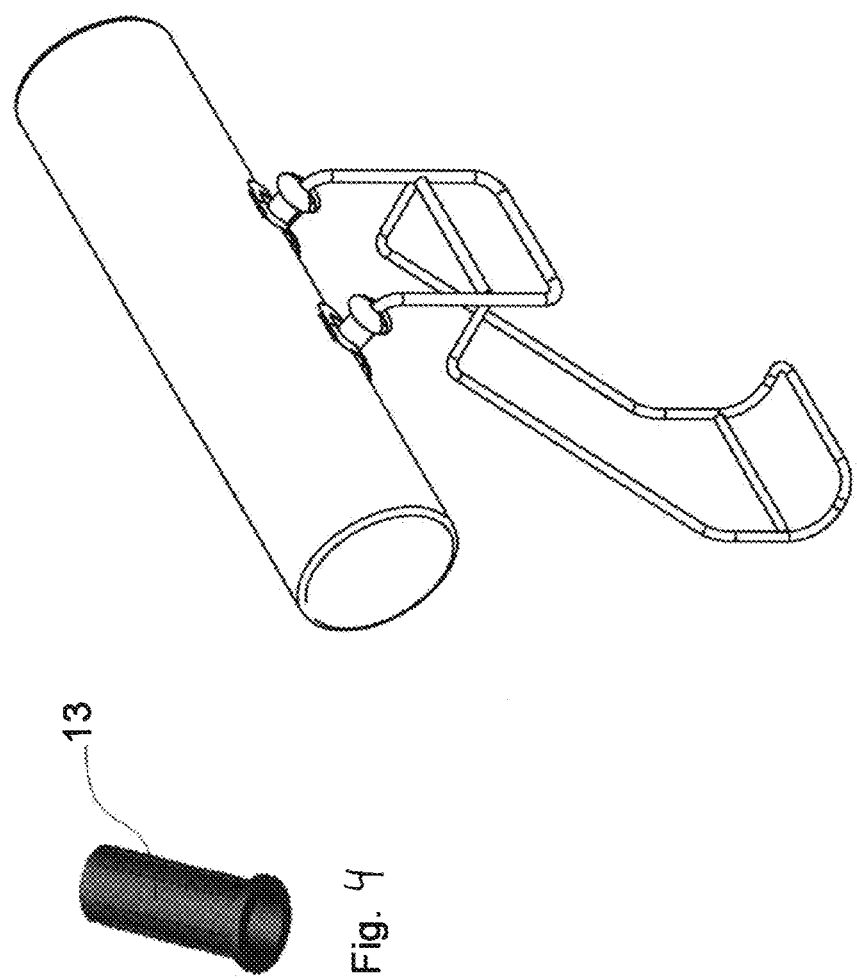

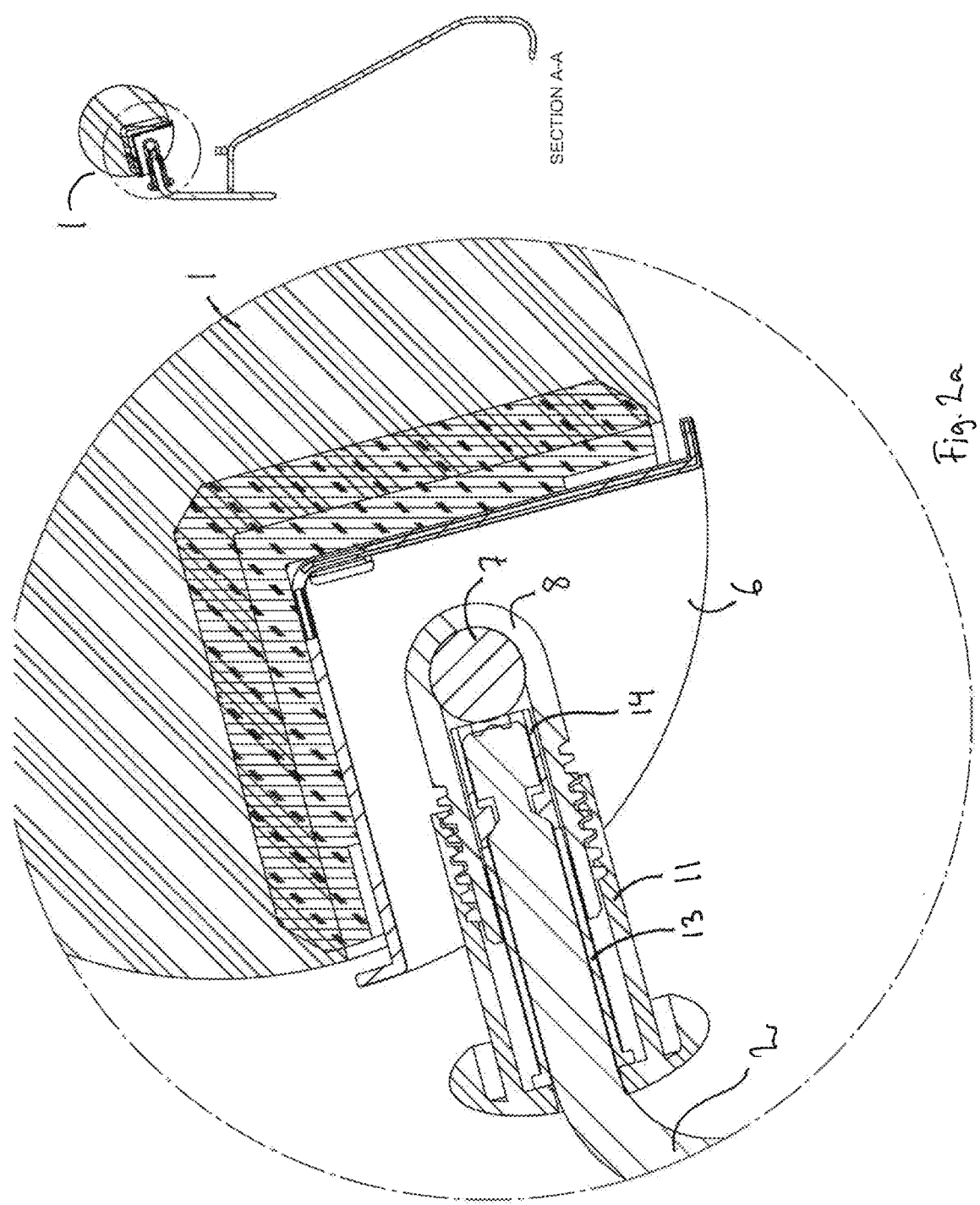

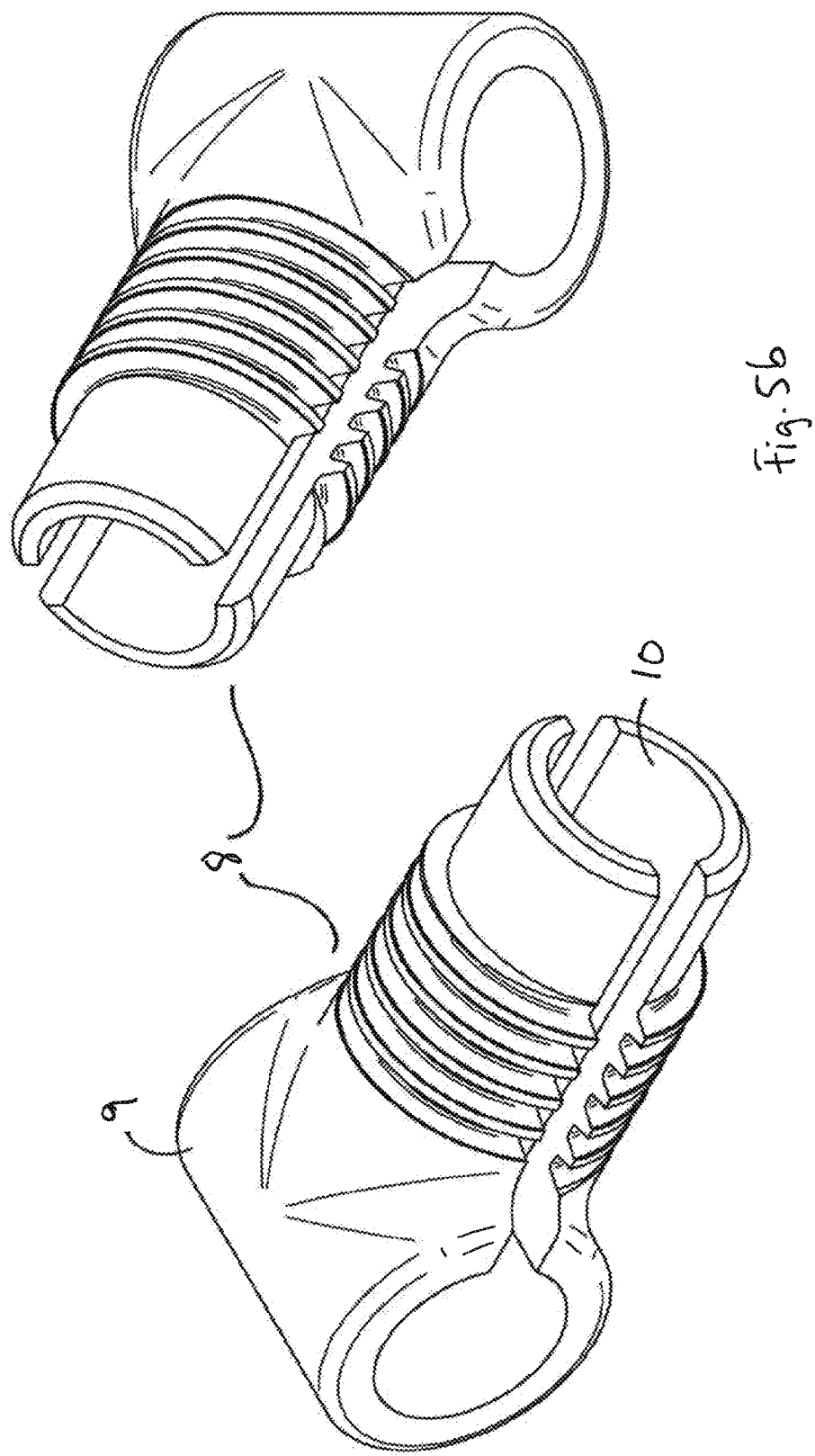

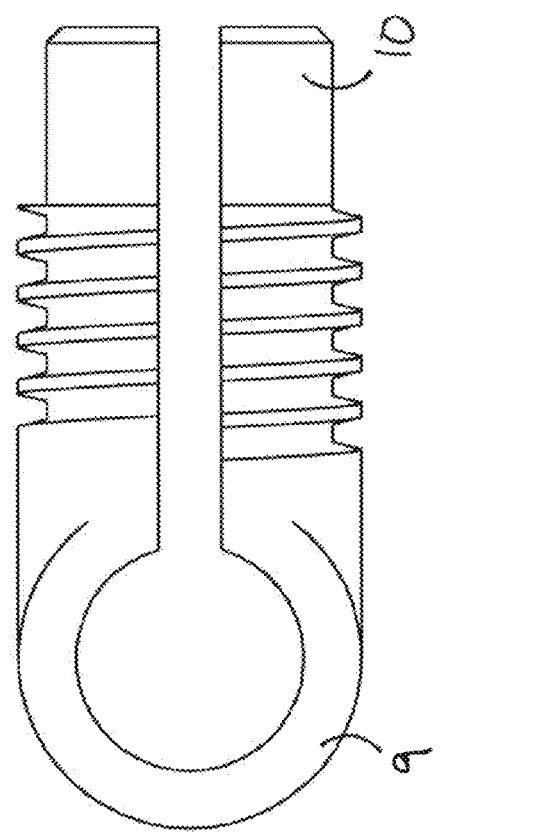

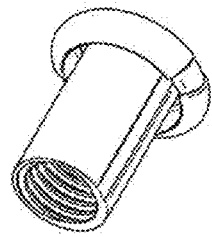
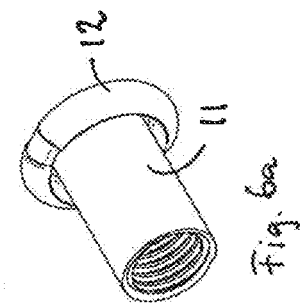
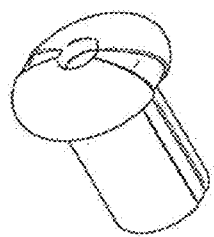
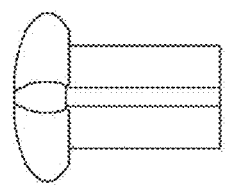
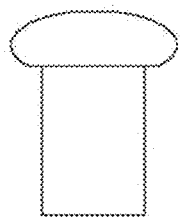
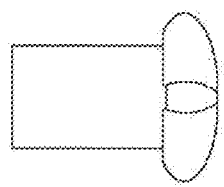
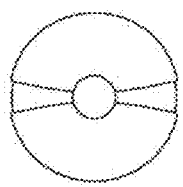
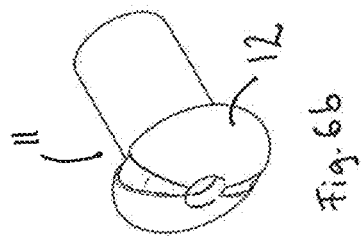
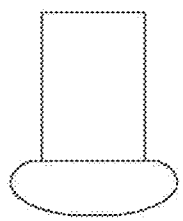
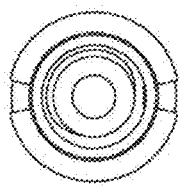

NECK REST

This application is a U.S. National Phase of International Patent Application Serial No. PCT/NO2011/000309, filed Nov. 2, 2011, and claims priority to Norwegian Application Serial No. NO 20101537 filed Nov. 2, 2010.

The present invention relates to furniture, more specifically to a headrest being mountable to a chair or sofa.

Headrests are used especially on resting chairs in homes and on seats in vehicles, where they are prescribed by law. The head rests can be fixed or adjustable in angle or height over the back rest. Such adjustable head rests comprises wedge-shaped neck rests being mounted on a stay than can be shifted upwards and downwards in bushings in the backrest. The neck rest is hinged on the lower side to the stay with a friction coupling. An example of such headrest is described in U.S. Pat. No. 5,316,372.

From U.S. Pat. No. 3,507,538, it is known a neck rest where the cushion is eccentric and rotatably connected to a mounting stay or arm. The cushion is attached to the stay or arm with a clamp coupling. However, the clamping power and thereby the friction in the coupling is not adjustable after mounting, and as a consequence, it will change over time. Furthermore, this solution has other constructional disadvantages, as the stay or arm is led into the cushion through openings.

Known neck rests have disadvantages in that the friction in the hinge mechanism in not adjustable and will be weakened over time due to e.g. wear and tear. Furthermore, a high and wedge-shaped neck will rest in reality only have one setting that fits the users. If the rest is tilted forwards, the contact area towards the head is moved upwards and away from the neck, where most people prefer to get support. Such neck rests can be practical in vehicles, where the headrest is not meant to provide comfort to the user, but only be a protection against rear collision.

It is an object with the present invention to provide a neck rest setting aside at least some of the disadvantages of known headrests.

This is obtained by a neck rest as it is stated in the following patent claims.

The invention will now be described in detail with reference to the attached drawings, where FIG. 1a-d shows the neck rest in perspective, frontal and sideways.

Figure 1A:
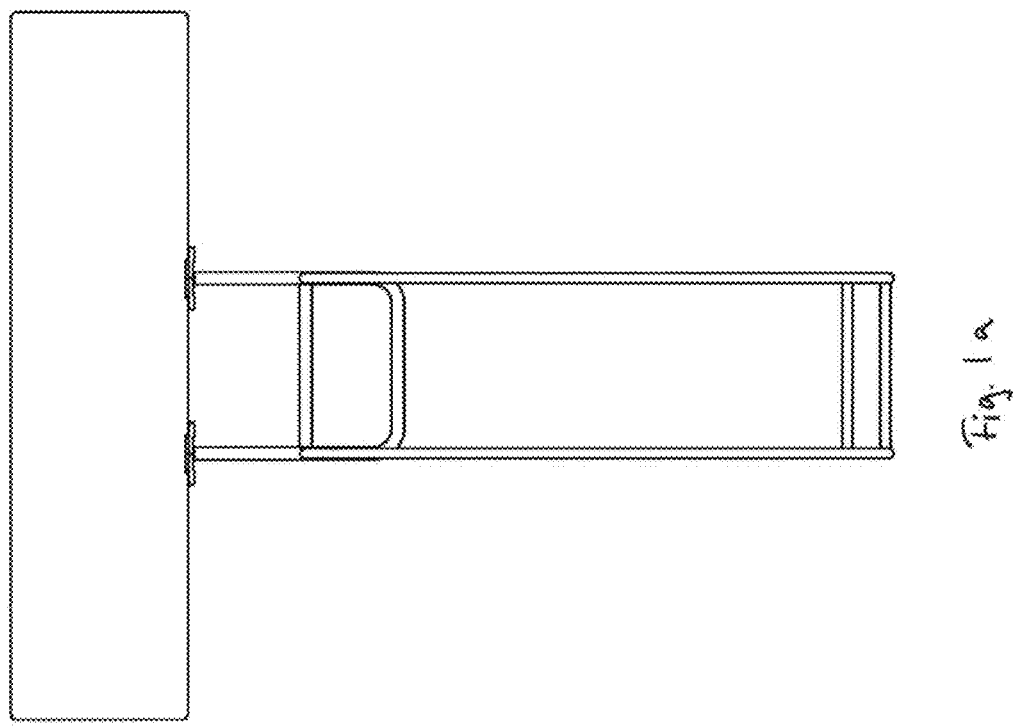
Figure 1C:
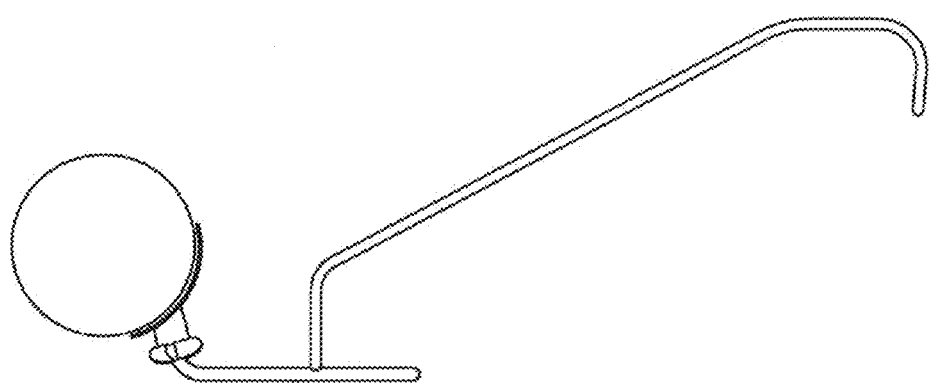
Figure 2B:
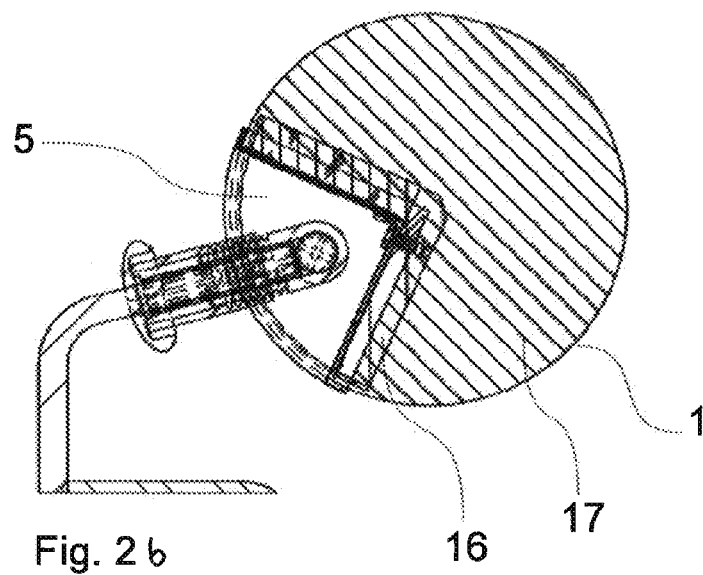
Figure 3:
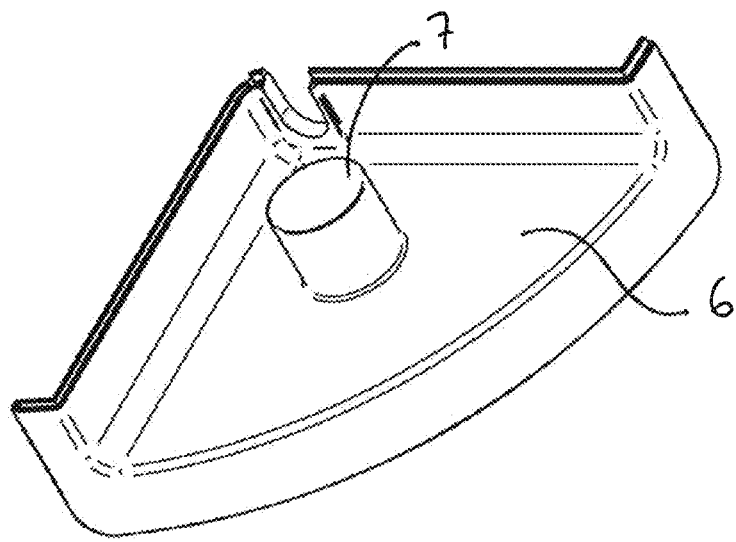

FIG. 2a-b shows section views through the neck rest.

FIG. 3-8 shows components included in the neck rest.

As shown in FIGS. 1a-d, the neck rest includes a generally cylindrical part, her called the neck cushion 1. The neck cushion is mounted on a stay 2 via hinges 3. The stay comprises two mounting arms 2' and 2", each being led to a hinge. The hinges 3 have adjustable friction and this friction is adjusted by means of a wheel 4. Furthermore, the hinge is arranged eccentric on the neck cushion. These details are also shown on the section in FIG. 2.

The neck cushion 1 is cylindrical, but with a sector shaped opening 5 for the hinge. The opening 5 is formed of two hinge elements 6 (FIG. 3) mounted towards each other. Each hinge element 6 has a spindle 7. When the elements are mounted towards each other, the spindles form a shaft around which the cushion can rotate.

On the shaft, a T-shaped revolving element 8 is mounted, FIG. 5a-c. The revolving element comprises a first sleeve 9 in which the spindles 7 are led, and also a second sleeve 10 which is threaded on the outside. The second sleeve is split on two sides, and these splits pass all the way into the first sleeve and divides also this sleeve on one side. The revolving element can also be solid.

A regulation sleeve 11 with wheel 12 is attached to the revolving element, FIG. 6a-c. The regulation sleeve is threaded on the inside, and is attached to the revolving element by screwing it onto the second sleeve 10.

Inside the regulation sleeve, there is a transfer bushing 13, FIG. 4. The transfer sleeve slides inside the second sleeve 10. In addition, the transfer sleeve will abut towards an inner flange in the regulation sleeve 11, on the underside of the wheel 4, and will be led inwards in the second sleeve when the regulation sleeve is tightened.

Figure 7A:
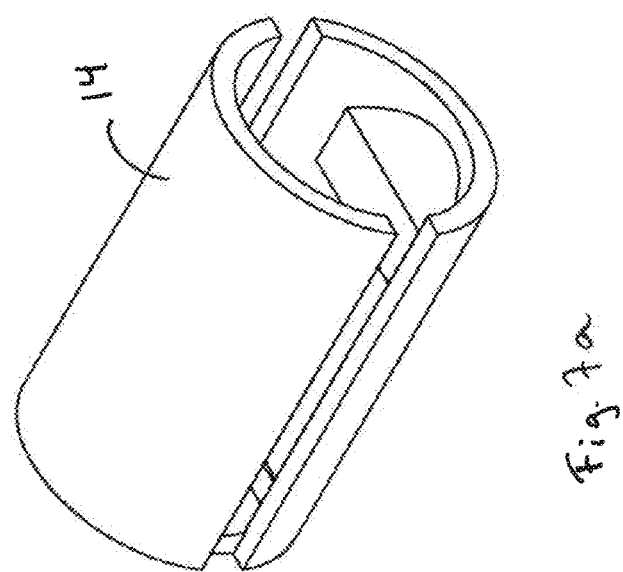
Figure 7B:
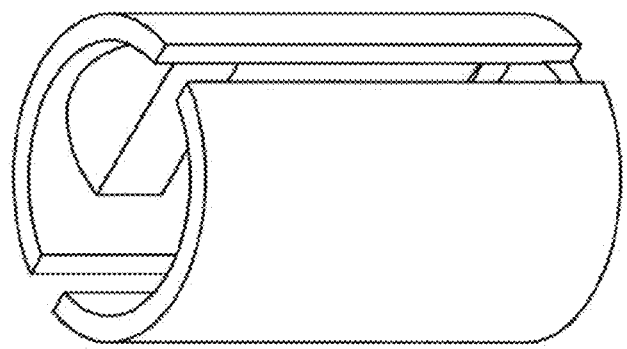
Figure 7C:
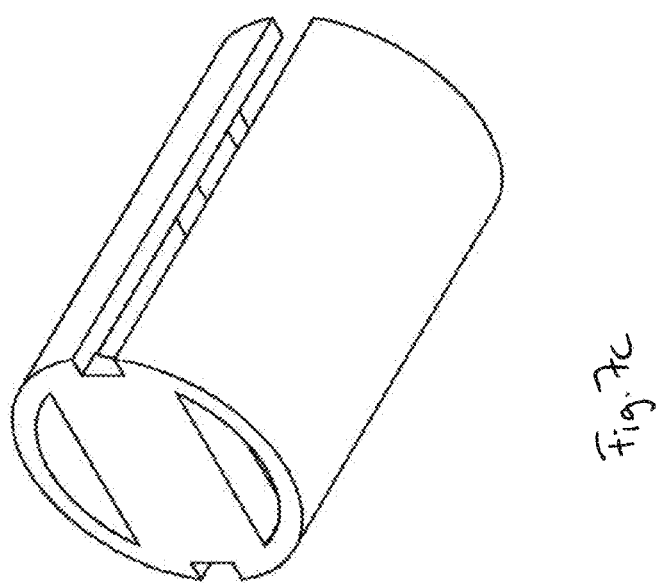
Figure 8:
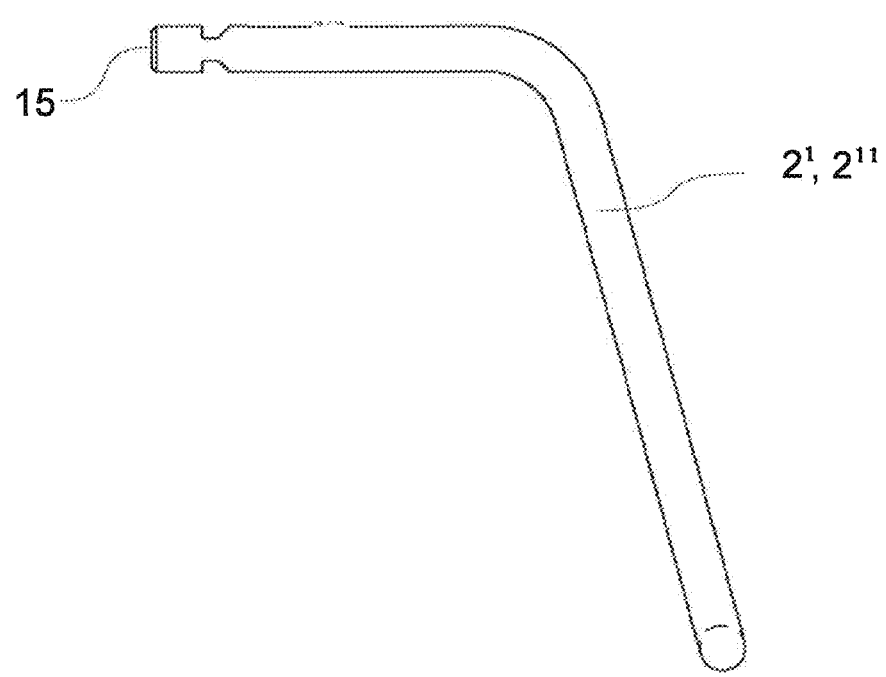

The transfer sleeve press on a clamping sleeve 14, FIG. 7a-c. The clamping sleeve 14 is sealed at one end. In addition, it is provided with hooks gripping into incisions towards the end 15 of the mounting arm 2', 2", FIG. 8.

FIG. 2a shows a sectional view of the hinge arrangement of the neck rest. Hinge element 6 is provided eccentrical in the neck cushion 1. A revolving element 8 is arranged on the spindle 7 of the hinge element 6 and onto on end of a mounting arm 2. A clamping sleeve 14 is arranged between the revolving element 8 and the mounting arm 2. A transfer bushing 13 is also arranged on the mounting arm 2. A regulation sleeve 11 is arranged on the mounting arm 2 in such a way that the threads of the regulation sleeve 11 are partly surrounding and partly interlocking with the threads of the revolving element. In this way that the regulation sleeve will press the sides of the revolving arm onto and away from the mounting arm, thereby opening and locking the regulation mechanism of the neck cushion.

When the wheel 12 is tightened, the transfer bushing 13 will press on the clamping sleeve 14, which again press on the shaft formed by the shaft spindles. In this way, the friction between the neck rest 1 and the stay 2 can be regulated.

The clamping sleeve 14 press on the shaft formed of the spindles and creates friction. At the same time, the clamping sleeve hold onto the mounting arm. The clamping sleeve is also held on place (in the incisions in the mounting arm) in that the second sleeve 10 holds around it. In this way, the arm cannot slip out.

The neck rest in itself comprises a core 16, FIG. 2b, on which there is attached a bolster 17. Thereafter, the neck cushion or bolster is covered in an outer material made of textile, leather, synthetic leather or other. Openings are provided in the outer covering, wherein the hinge elements 6 are mounted and attached to the core by one or more screws, nails or similar.

The neck rest can be rotated within the sector formed by the opening 5. Due to the cylindrical shape and the eccentric hinging, the neck rest can be rotated to a position fitting the user and which is comfortable for the user in all positions.

The transfer bushing 13 can be provided with grooves on the outside that fits into or mesh with corresponding grooves on the inside of the second sleeve 10. The grooves on the second sleeve 10 can be formed by the slits dividing the sleeve. The grooves prevent the transfer sleeve from rotating in relation to the second sleeve. In the same way, the can be longitudinal grooves on the inside of the transfer sleeve which fit around or into or mesh with corresponding grooves in the mounting arm. It is obvious that it is not compulsory for the mounting arm to have a circular cross section, but it can for example be quadrangular in cross section. Then, the transfer sleeve should have a shape on the inside corresponding to the outer shape of the mounting arm.

Each part of the hinging mechanism, that is the hinging elements, revolving element, regulation sleeve, transfer sleeve and clamping sleeve can be made of a metal such as aluminium, a polymeric material or a fibre reinforced polymeric material. The parts can be made of different materials.

The invention claimed is:

1. A neck rest apparatus comprising
a neck cushion rotatably attached to a mounting arm having an outside mounting arm surface, sector-shaped hinge elements, each having a spindle, wherein the hinge elements are arranged to be mounted towards each other so that the spindles cooperatively form a shaft,
a T-shaped revolving element attached to the shaft, the revolving element includes a first sleeve coupled around the shaft and a second sleeve having an outside second sleeve surface and second sleeve inside portion and coupled with the first sleeve, wherein the second sleeve is arranged to hold the mounting arm,
and the second sleeve includes threads on the outside second sleeve surface,
a regulation sleeve surrounding and threaded onto the second sleeve, the regulation sleeve having a regulation sleeve inside portion;
a transfer sleeve having a transfer sleeve outside surface and a transfer sleeve inside portion and being arranged inside the second sleeve and outside the mounting arm, wherein one end of the transfer sleeve abuts a flange on the regulation sleeve inside portion and the other end abuts a clamping sleeve which is clamped around the mounting arm, wherein the clamping sleeve is pressed onto the shaft formed by the spindles.

2. The neck rest apparatus according to claim 1, wherein the second sleeve is provided with slits on two sides and the first sleeve is split on one side.

3. The neck rest apparatus according to claim 1, wherein the regulation sleeve is provided with a wheel.

4. The neck rest apparatus according to claim 1, wherein grooves are disposed on the transfer sleeve outside surface that meshes with corresponding grooves disposed on the second sleeve inside portion.

5. The neck rest apparatus according to claim 1, wherein grooves are disposed on the transfer sleeve inside portion that meshes with corresponding grooves disposed on the outside mounting arm surface.

6. The neck rest apparatus according claim 1, wherein each of the hinge elements, revolving element, regulation sleeve, transfer sleeve and clamping sleeve are made of metal, a polymeric material or a fiber reinforced polymeric material.

7. The neck rest apparatus of claim 1, further comprising a second mounting arm.

* * * * *